No. 609,503. Patented Aug. 23, 1898.
I. FAUNCE.
BALL BEARING.
(Application filed May 11, 1898.)
(No Model.)
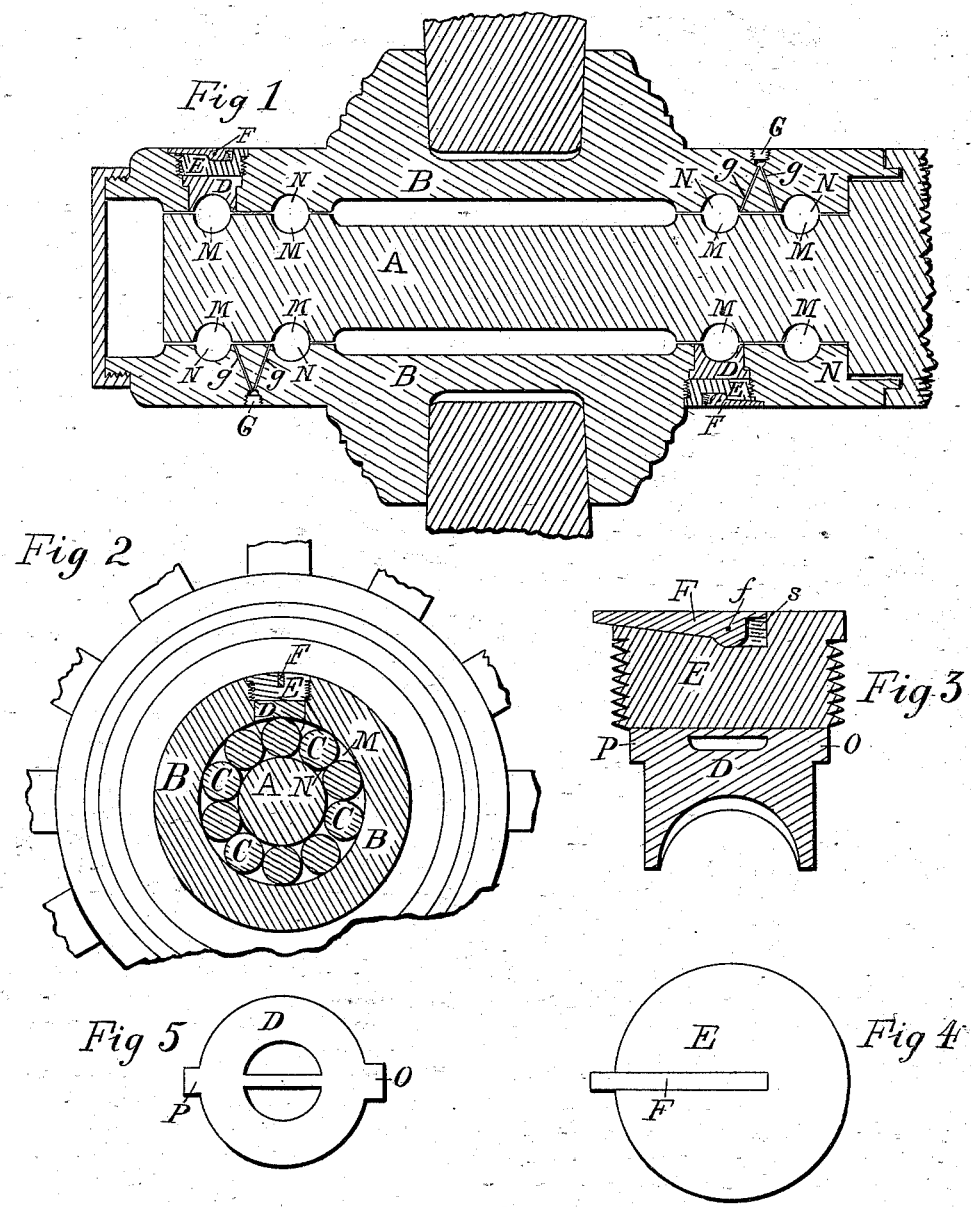
Witnesses:-
Inventor:-

UNITED STATES PATENT OFFICE.

IRA FAUNCE, OF WILLIAMSVILLE, ILLINOIS.

BALL-BEARING.

SPECIFICATION forming part of Letters Patent No. 609,503, dated August 23, 1898.

Application filed May 11, 1898. Serial No. 680,401. (No model.)

*To all whom it may concern:*

Be it known that I, IRA FAUNCE, a citizen of the United States, and a resident of Williamsville, in the county of Sangamon and State of Illinois, have invented a new and useful Improvement in Ball-Bearing Axles and Hubs, of which the following is a specification.

My invention relates to vehicle axles and hubs where the weight on the axle is carried on a series of balls rolling in grooves about the axle and in the hub and is illustrated in the accompanying drawings, in which—

Figure 1 is a longitudinal section centrally through axle and hub. Fig. 2 is a cross-section through axle and hub on the central line of one of the series of balls. Fig. 3 is an enlarged section of the plugs shown in Fig. 1 used in stopping the hole in the hub where the balls are inserted and removed from their places in the hub and axle. Fig. 4 is a posterior view of the outer plug, showing a locking device for holding it in place; and Fig. 5 is a posterior view of the inner plug, showing its lugs.

Similar letters refer to similar parts throughout the several figures.

My invention consists of an axle A, having in it several annular grooves M M, semicircular in section, passing around it in planes perpendicular to the central line of the axle, a hub B, fitted over the axle A and with several grooves N N in its inner surface, semicircular in section and corresponding with those in the axle A, so that hub B and axle A may operate together, the grooves M and N in each series forming a perfect annular groove of circular section, a series of balls C C of a size and number to fill the several series of annular circular grooves made by the grooves M M and N N, a plug D, placed in the hub B, one for each series of balls and grooves, although only two are shown, made removable, so that the balls in each series may be inserted or removed easily, a plug E, turning into the hub B in a series of threads and having a locking device F at its outer surface, the plug G, threaded into the hub, and small holes $g\ g$, leading from the pit in which plug G is placed to the series of grooves and balls.

The hub B is slipped over the axle A, and the balls C C are placed in their proper places by removing the plugs E and D and inserting the balls till the annular circular groove has the requisite number within it. The plug D is then set in place, the anterior end of which is cut semicircular to correspond with the part of the hub removed which the plug D replaces. There are two lugs O and P on the sides of plug D, near the posterior end, which fit closely into slots cut in the hub B. The said lugs O and P hold the plug D firmly in place, so there can be no rotary movement of plug D and no interference with the movement of the balls C C in their respective grooves. The lugs O and P also prevent plug D from being forced nearer the axle A than is proper by striking with their anterior edges the ends of the slots into which they fit. The lugs O and P are made of different sizes to make it impossible to wrongly fit the plug D into position. Plug D has a small hook-lift in its posterior end by which it can be removed.

The plug E is screwed into the hub B till its anterior end fits tightly against the posterior end of plug D, and thus makes D as solid and firm as if it were a part of the hub B. Plug E has a lock F in its exposed end, which when in place rests flush with the surface of the hub B and plug E. Lock F moves on a pin $f$ and is held in its normal position by a coil-spring $s$. The lock F also acts as a wrench by which the plug E may be removed.

Each one of the series of circular grooves is provided with the means for removing and replacing the balls heretofore described; but they are located on the hub so that no two of them will lie in the same plane on the same side of the hub.

I provide for oiling the balls and annular grooves through holes $g\ g$, passing from the annular grooves and balls to a pit in the hub B, into the outer part of which the plug G is screwed. Plug G is to be removed by an ordinary screw-driver.

Having thus described my invention, what I believe to be new, and desire to secure by Letters Patent, is—

In a ball-bearing axle and hub, the combination with an axle A having several annular grooves in its surface, the hub B with annular grooves on its inner surface corresponding with those in the axle, balls C C filling the raceways formed by the grooves in the axle and hub, plug D with lugs O and P near its posterior end and with its anterior end cut across with a curved groove semicircular in section, plug E having threads on its perimeter, its anterior end fitting firmly against plug D and in its posterior end a locking-arm F, pin $f$ and coil-spring $s$, the plug G threaded as a screw and holes $g\ g$, all substantially as and for the purposes set forth.

IRA FAUNCE.

In presence of—
  R. L. ROSEBROUGH,
  ED. L. GROVES.